US008598856B1

(12) United States Patent
Carroll et al.

(10) Patent No.: US 8,598,856 B1
(45) Date of Patent: Dec. 3, 2013

(54) POWER SUPPLY SWITCHING AND DISCONTINUOUS POWER SUPPLY MODE

(75) Inventors: Robert T. Carroll, Andover, MA (US); Venkat Sreenivas, Winchester, MA (US); David Williams, Andover, MA (US)

(73) Assignee: International Rectifier Corporation, El Segundo, CA (US)

( * ) Notice: Subject to any disclaimer, the term of this patent is extended or adjusted under 35 U.S.C. 154(b) by 375 days.

(21) Appl. No.: 12/828,857

(22) Filed: Jul. 1, 2010

Related U.S. Application Data

(60) Provisional application No. 61/308,229, filed on Feb. 25, 2010.

(51) Int. Cl.
  *G05F 1/44* (2006.01)
  *G05F 1/56* (2006.01)
(52) U.S. Cl.
  USPC ........... 323/282; 323/284; 323/285; 323/286; 323/222; 323/223
(58) Field of Classification Search
  USPC .................. 323/282, 284, 285, 286, 222, 223
  See application file for complete search history.

(56) References Cited

U.S. PATENT DOCUMENTS

| | | | | | |
|---|---|---|---|---|---|
| 5,612,610 | A | * | 3/1997 | Borghi et al. | 323/222 |
| 5,982,160 | A | * | 11/1999 | Walters et al. | 323/282 |
| 5,994,885 | A | * | 11/1999 | Wilcox et al. | 323/285 |
| 6,956,361 | B1 | * | 10/2005 | Mozipo et al. | 323/283 |
| 7,330,019 | B1 | * | 2/2008 | Bennett et al. | 323/282 |
| 2010/0090671 | A1 | * | 4/2010 | Zhang et al. | 323/283 |
| 2011/0110132 | A1 | * | 5/2011 | Rausch et al. | 363/124 |

* cited by examiner

*Primary Examiner* — Bao Q Vu
(74) *Attorney, Agent, or Firm* — Chapin IP Law, LLC

(57) ABSTRACT

According to example configurations herein, while operating a power supply in a discontinuous power supply mode, a controller initiates activation of a first switch of the power supply to increase a magnitude of current flowing through an inductor. The flow of current through the inductor produces an output voltage for powering a load. The controller estimates a time duration in which to activate a second switch of the power supply to reduce the current flowing through the inductor. The controller uses the estimated time duration as a parameter for controlling the second switch in the power supply. For example, upon or after deactivating the first switch, the controller initiates activation of the second switch for the estimated time duration. Deactivation of the second switch based on the estimated time duration reduces or eliminates a need to employ complex circuitry to physically measure a magnitude of current through the inductor.

26 Claims, 8 Drawing Sheets

POWER SUPPLY SWITCHING AND DISCONTINUOUS POWER SUPPLY MODE

RELATED APPLICATIONS

This application is related to and claims the benefit of earlier filed U.S. Provisional Patent Application Ser. No. 61/308,229 entitled "Discontinuous Mode with Calculated Synchronous Detector On-time," filed on Feb. 25, 2010, the entire teachings of which are incorporated herein by this reference.

BACKGROUND

Conventional buck power supply systems sometimes use an analog comparator circuit to physically measure when the current in an inductor goes to zero so that a respective synchronous rectifier field effect transistor (e.g., low side switch connecting the inductor to ground) can be turned off. Turning off the synchronous switch at or around a time of measuring zero current in the inductor reduces and/or eliminates negative current in the inductor.

One way to measure current through the inductor is to physically measure a voltage indicative of a magnitude of current through the inductor via a comparator circuit. Since a magnitude of such a voltage sensed by the comparator can be quite small (e.g., such as in the millivolt range), a respective comparator in the conventional buck power supply typically has to be very precise and accurate.

In certain cases, the conventional comparator circuit for detecting a magnitude of current through the inductor must be co-located with a corresponding switch driver circuit to sense the voltage across the synchronous switch. When a switch driver and respective controller are separated from each other, the switch driver must transmit a communication signal back to the controller to notify the controller when the inductor current is negative and/or a time of turning off a synchronous rectifier switch. Based on receipt of the communication signal from the switch driver, the controller is able to switch between so-called discontinuous and continuous control mode operations.

BRIEF DESCRIPTION

Conventional applications such as those as discussed above can suffer from a number of deficiencies. For example, inclusion of the extra comparator and related circuitry supporting the communication signal make a switch driver circuit and/or controller more complex and costly to manufacture. In addition to increased costs and complexity, conventional circuits that physically measure the current in the inductor and those that support communication as discussed above typically take up valuable space on a semiconductor chip or circuit board.

Embodiments herein deviate with respect to conventional applications. For example, embodiments herein are directed to unique ways of implementing a switching power supply in a discontinuous operational mode.

More specifically, one embodiment herein includes operating a power supply in a discontinuous switching mode. For example, while operating the power supply in the discontinuous power supply mode, a controller initiates activation of a first switch of the power supply to increase a magnitude of current flowing through an inductor. The flow of current through the inductor produces an output voltage for powering a load. In contrast to conventional techniques, the controller estimates a time duration in which to activate a second switch of the power supply to reduce the current flowing through the inductor.

The controller uses the estimated time duration as a parameter for controlling the switches in the power supply. For example, after activating a first switch to increase current though the inductor, the controller initiates activation of the second switch for the estimated time duration to reduce a magnitude of current through the inductor. Deactivation of the second switch based on an estimated time duration reduces or eliminates a need to employ complex circuitry to measure when a magnitude of current through the inductor is zero to shut off the second switch. In other words, according to one embodiment, instead of deactivating the second switch based on physically measuring an amount of current through the inductor, embodiments herein include deactivating the second switch based on an estimated time duration.

In further embodiments, the controller is configured to estimate how long to activate the second switch of the power supply to reduce the magnitude of the current flowing through the inductor to substantially zero amperes. In such an embodiment, the controller activates the second switch for the estimated time duration to reduce the magnitude of the current flowing through the inductor to substantially zero amperes.

The controller can estimate the time duration for activating the second switch based at least in part on an estimated amount of current flowing through the inductor at a time of deactivating the first switch. For example, in one embodiment, the current through the inductor increases at a substantially linear rate when the first switch is activated and the second switch is deactivated. The amount of current through the inductor can be approximated based on how long the first switch is or will be activated.

When the second switch is activated and the first switch is deactivated, the current through the inductor decreases at a substantially linear rate. As discussed herein, the amount of time required to activate the second switch can be estimated based on one or more parameters such as how long the first switch is activated, a rate of increased current through the inductor when the first switch is activated, a rate at which the current decreases through the inductor when the second switch is activated, etc.

In accordance with further embodiments, the controller can be configured to switch between operating in a continuous and discontinuous operational mode. For example, according to one embodiment, the controller monitors or estimates an amount of current through the inductor while the power supply is in a continuous power supply mode.

In one embodiment, in response to detecting that a magnitude of the average current through the inductor during the continuous mode is below a threshold value or that the current through the inductor is negative for at least a portion of a switching cycle, the controller can initiate switchover from the continuous power supply mode to the discontinuous power supply mode. The threshold value can be a programmable value such as a digital value received by the controller. In such an embodiment, the controller receives, as input, a programmed threshold value. The controller monitors a magnitude of the output voltage produced by a respective phase inductor (or output voltage of the power supply). In response to detecting that the magnitude of the output voltage is below the received, programmed threshold value while the first and the second switch are deactivated, the controller initiates repeating a discontinuous mode switching cycle, the discontinuous mode switching cycle including: i), initiating, while the second switch is deactivated, activation of the first switch of the power supply to increase the magnitude of current flowing through the respective phase inductor to power the load; ii) deactivating the first switch; iii) while the first switch is deactivated, initiating activation of the second switch for the estimated time duration; iv) deactivating the second switch; and v) during deactivation of both the first switch and the second switch, providing power to the load via a capacitor coupled to a second node of the phase inductor.

While in the discontinuous operational mode, the controller can initiate switchover of the power supply to the continuous operational mode depending on operating conditions. For example, in one embodiment, subsequent to initiating activation of the second switch for the estimated time duration to reduce the current in the inductor to approximately zero, the controller can perform steps of: deactivating the second switch upon expiration of the estimated time duration; monitoring a magnitude of the output voltage produced by the inductor to power the load; and in response to detecting that the magnitude of the output voltage drops below a threshold value in less than a predetermined amount of time since a time of deactivating the second switch, switching operation of the power supply from the discontinuous power supply mode to a continuous power supply mode. This latter condition of detecting that the output voltage drops below a threshold value in less than a predetermined time can indicate that the load consumes an increased amount of current and that the power supply should therefore operate in the continuous operational mode rather than the discontinuous mode. The predetermined time duration for determining whether to switch modes can be set by a user operating the controller.

Note that the time duration for activating the second switch can be estimated in different ways. For example, according to one embodiment, the controller can calculate the time duration based at least in part on a magnitude of an input voltage and a magnitude of the output voltage of the power supply. A magnitude of the input voltage and the output voltage will have an affect upon a rate of increasing current through the inductor and a rate of decreasing the current through the inductor.

When activated, the first switch electrically couples the input voltage to a first node of the inductor. As discussed above, coupling of the input voltage to the inductor increases a magnitude of current through the inductor and produces an output voltage at a second node of the inductor to power the load.

In accordance with another embodiment, as briefly mentioned above, the controller calculates the time duration for activating the second switch based at least in part on how long the first switch is activated to increase the magnitude of current flowing through the inductor to power the load.

The second switch (e.g., low side switch) can be activated based at least in part on an amount of time (e.g., ON_TIME$_{SW1}$) that the first switch is activated. In such an instance, assuming that the controller activates the first switch when there is approximately no current through the inductor, the duration of time for activating the second switch can be calculated, in one embodiment, as follows:

estimated ON_TIME$_{SW2}$=ON_TIME$_{SW1}$*($V_{IN}$−$V_{OUT}$)/$V_{OUT}$ where SW2 is the synchronous switch or low side switch, where SW1 is the control switch or high side switch;
where ON_TIME is the time for activating a respective switch,
where Vin is an input voltage converted into output voltage, $V_{OUT}$.

Note that adjustments can be made to a switch activation signal in the event that there is a delay between a time of activating/deactivating the first switch and a time that the first switch is actually activated or deactivated.

Also, the time for activating the first switch can be programmable. In one embodiment, the first switch can be activated for a predetermined amount or fixed of time (as programmed by a user) to increase the current through the inductor during a first part of a switching cycle when the first switch is activated. More specifically, in one embodiment, the controller as discussed herein can receive, as input, a value representing an ON-time for activating the first switch when in the discontinuous mode. The controller stores the received input value. When in the discontinuous mode, during or at a beginning of control cycles such as between T1 and T2, between T4 and T5 in FIG. 3, the controller initiates activation of the first switch based on the time as specified by the stored value. Accordingly, a user programmable value such as a digital value received from a user as digital input can be used as a time in which to activate the control switch or high side switch.

In accordance with other embodiments, the first switch can be deactivated based on occurrence of an event such as when the output voltage reaches a threshold value. As mentioned above, the amount of time that the second switch is activated to reduce the magnitude of current through the inductor can vary depending on a magnitude of the input voltage, output voltage, etc.

While in the discontinuous mode, subsequent to activating the second switch for the estimated time duration, the controller maintains both the first switch and the second switch in a deactivated state for at least a short time duration until a magnitude of the output voltage drops to or below a threshold value. Upon detecting that the output voltage reaches or drops below a threshold value while in the discontinuous mode, the controller initiates activation of the first switch again to increase a magnitude of the output voltage such that the output voltage stays within a desired tolerance.

Thus, in one embodiment, the discontinuous mode includes monitoring a magnitude of the output voltage produced by the inductor and, in response to detecting that the magnitude of the output voltage is below a threshold value, the controller initiates repeating a discontinuous mode switching cycle. For example, each switching cycle in the discontinuous mode can include: i) while the second switch is deactivated, initiating activation of the first switch of the power supply to increase the magnitude of current flowing through the inductor to power the load; ii) deactivating the first switch and initiating activation of the second switch for the estimated time duration while the first switch is deactivated; and iii) during deactivation of both the first switch and the second switch, providing power to the load via a capacitor bank circuit coupled to a second node of the inductor.

Note that the controller can initiate switching from the discontinuous mode to a continuous mode depending on operating conditions. For example, in one embodiment, subsequent to initiating activation of the second switch for the estimated time duration, the controller maintains both the first switch and second switch in a deactivated state. While in this tri-state mode when both switches (e.g., high side switch and low side switch) are deactivated, the controller can monitor a magnitude of the output voltage produced by the inductor to power the load as discussed above. As mentioned above, in response to detecting that the magnitude of the output voltage drops below a threshold value in less than a predetermined amount of time since a time of deactivating the second switch, the controller can initiate switching operation of the power supply from the discontinuous power supply mode to a continuous power supply mode.

These and other more specific embodiments are disclosed in more detail below.

The embodiments as described herein are advantageous over conventional techniques. For example, one embodiment herein includes a method and system for implementing a discontinuous switching power supply mode that does not require a zero current detection comparator or special communications protocol between the controller and external driver as in conventional methods. In comparison to conventional techniques, the controller and/or related circuitry as discussed herein is less complex and therefore more easily implemented in a relatively small circuit package.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a unique and cost effective implementation of a discontinuous power supply mode. For example, the discontinuous power supply mode as discussed herein can provide high power conversion efficiency, even at relatively light load conditions when a load consumes a small amount of current. In a specific embodiment, the discontinuous power mode as discussed herein can be configured to determine when to shut off a low-side switch of the power supply based on an estimation when the inductor current is approximately zero as opposed to physically measuring when the current in the inductor goes to zero. Thus, embodiments herein can operate in a discontinuous power supply mode without a need for complex circuitry to physically measure the current through the inductor.

Also, one embodiment herein includes operating a high side switch for a fixed or constant on-time when in the discontinuous power supply mode. The value for the fixed on-time can be selected by a user and stored in non-volatile memory accessible by a controller. A switching frequency in the discontinuous mode can vary depending on a magnitude of the load. A user can select the on-time of the high-side switch depending on values chosen for an inductor and corresponding output capacitor in the power supply. Selection of an on-time for the high side switch can ensure that the ripple on the output voltage does not exceed a maximum value during operation. As discussed below, the controller achieves high efficiency by reducing an RMS (Root Mean Square) inductor current while in the discontinuous power supply mode.

Figure 1:
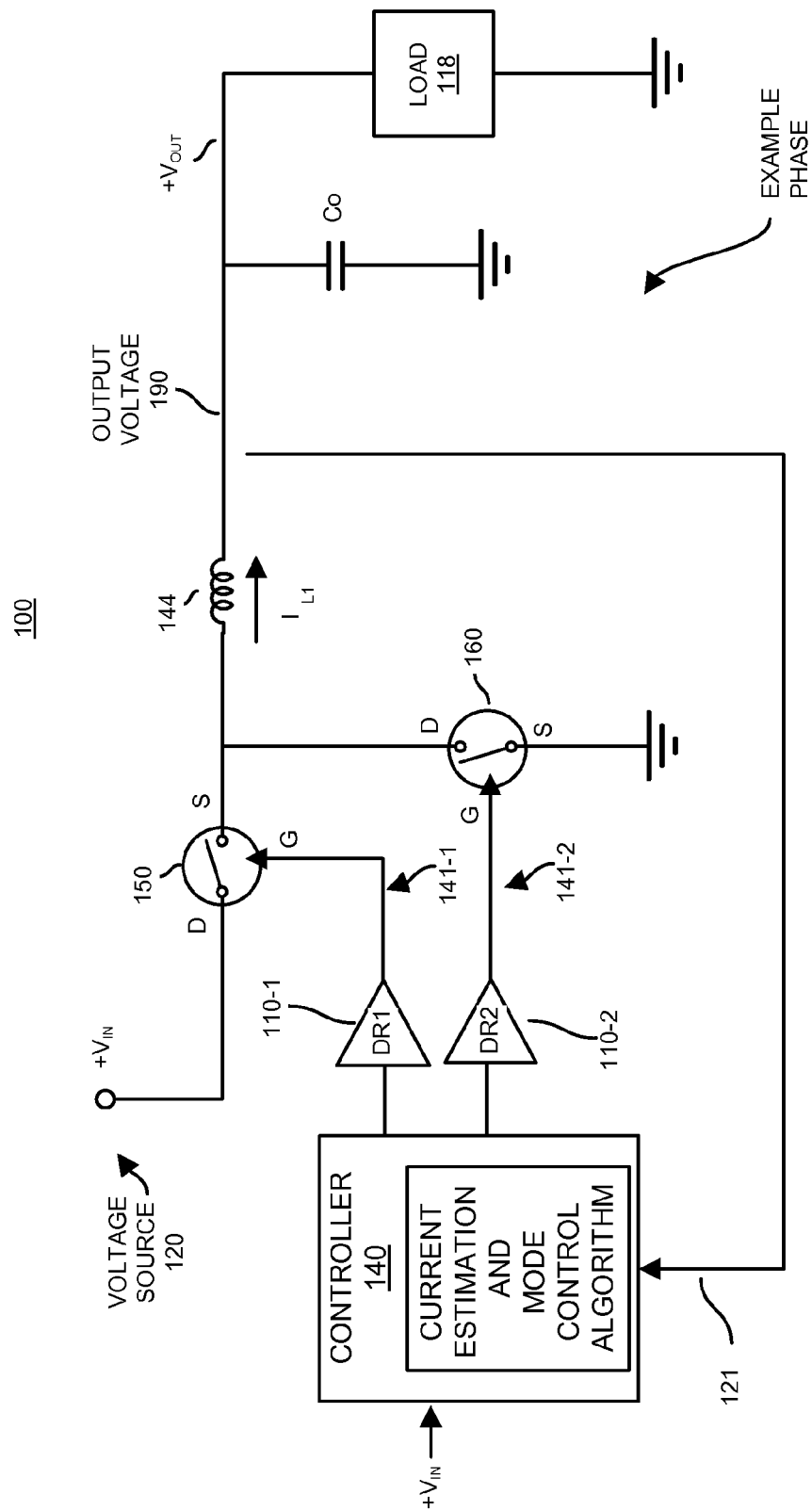
FIG. 1 is an example diagram of a power supply according to embodiments herein.

FIG. 1 is an example diagram of a power supply 100 according to embodiments herein. As shown, the power supply 100 includes controller 140. Controller 140 controls an operation of power supply 100 via a current estimation and mode control algorithm to produce an output voltage 190.

More specifically, according to one embodiment, controller 140 receives inputs or feedback 121 such as Vin, Vout, etc.

Based on the received inputs and configuration settings of controller 100, controller 100 outputs control signals to switch the high side switch 150 and low side switch 160 ON and OFF. Switching operation of high side switch 150 and low side switch 160 produces output voltage 190 to power load 118.

The controller 140 generates signals controlling the driver circuits 110-1 and 110-2. Based on control signals received from the controller 140, driver 110-1 controls a state of high side switch 150 (e.g., a control switch) and driver 110-2 controls a state of low side switch 160 (e.g., a synchronous switch) in power supply 100.

Note that driver circuits 110 (e.g., driver circuit 110-1 and driver circuit 110-2) can be located in the controller 100 or can reside at a remote location with respect to the controller 100.

When high side switch 150 is turned ON (i.e., activated) via control signals generated by controller 100 (while the low side 160 or synchronous switch is OFF), the current through inductor 144 increases via a highly conductive path provided by high side switch 150 between voltage source 120 and inductor 144.

When low side switch 160 is turned ON (i.e., activated) via control signals generated by controller 100 (while the high side switch 150 or control switch is OFF), the current through inductor 144 decreases based on a highly conductive path provided by the low side switch 160 between the inductor 144 and ground as shown.

Based on switching of the high side switch 150 and the low side switch 160, the controller 140 regulates the output voltage 190 within a desired range to power load 118.

In one embodiment, power supply 100 can include multiple phases. Each of the multiple phases can be similar to the example phase shown in FIG. 1. In such an embodiment, the controller 100 operates the phases to maintain the output voltage 190 within a desired range to power load 118.

Each phase can include a respective high side switch circuit and low side switch circuit as previously discussed. To deactivate a respective phase, the phase controller 140 can set both high side switch circuitry and low side switch circuitry of the respective phase to an OFF state. When off or deactivated, the respective phase does not contribute to producing current to power the load 118.

The controller 140 can select how many phases to activate depending on an amount of current consumed by the load 118. For example, when the load 118 consumes a relatively large amount of current, the controller 100 can activate multiple phases to power the load 118. When the load 118 consumes a relatively small amount of current, the controller 140 can activate a single phase to power the load 118.

Any of multiple different types of methods such as estimations or physical measurements can be used to detect an amount of current consumed by the load 118.

Embodiments herein include operating one or more of the phases in a unique discontinuous mode as discussed herein to power load 118. For example, in accordance with a general embodiment herein, the controller 140 operates switches 150 and 160 to produce an output voltage 190 while in a continuous operational mode. The controller 140 can be configured to digitally monitor (via feedback 121) a parameter such as the total current to the load 118 to determine whether to switch from a continuous switching mode to discontinuous switching mode. More specifically, if the average current supplied to the load 118 falls below a threshold value, the controller 140 can initiate operation of the power supply 100 in a discontinuous mode.

For example, while in the continuous mode, the controller 140 can monitor a power supply parameter such as the ripple current. Detecting when the ripple current falls below a threshold value such as zero indicates a relatively light load condition (e.g., the load 118 consumes relatively low current).

To avoid false triggering and switching over from the continuous mode to a discontinuous switching mode, the controller 140 can require several cycles of negative inductor current detection or a current below a threshold value to trigger a change in mode from the continuous operational mode to a discontinuous operational mode.

If it has been determined that the current through the inductor 144 is approximately zero or below a threshold value because the load 118 is relatively light, the controller 140 switches to the discontinuous mode. The threshold value can be programmed via a user and stored in a repository such as non-volatile memory of the controller 140.

After switching to the discontinuous mode based on detecting the light load condition, the controller 140 monitors the output voltage 190. Upon detecting that a magnitude of the output voltage 190 drops below the programmed threshold value such as a received digital value inputted to the controller, the controller 140 activates (e.g., turns ON) the high side switch 150. As mentioned above, activation of the high side switch 150 increases an amount of current through the inductor 144 to the load 118.

In one embodiment, the controller 140 activates the high side switch 150 for a preprogrammed duration of time. The preprogrammed duration of time can be user selectable and stored in the controller 140. As previously discussed, activation of the high side switch 150 increases a magnitude of the output voltage 190.

Subsequent to activating the high side switch 150 (e.g., a so-called control switch) for a preprogrammed duration of time, the controller 140 deactivates the high side switch 150 and activates the low side switch 160 (e.g., a so-called synchronous switch). The controller 160 initiates activation of the low side switch for an estimated amount of time to discharge the inductor to approximately zero current.

In one embodiment, the calculated period or estimated time duration for activating the low side switch is calculated based at least in part on parameters such as the input voltage, the output voltage, the pulse width of the control FET pulse, a driver pulse truncation time, etc. as will be discussed in more detail below.

After activating the low side switch 160 for the estimated time duration in a given switching cycle, the controller 140 deactivates the low side switch 160.

While in a tri-state mode (e.g., both high side switch 150 and low side switch 160 are deactivated) of a switching cycle, the controller 140 waits for the output voltage 190 to drop below a predetermined threshold value. After detecting that the output voltage 190 drops below a threshold value, the controller 140 initiates the control cycle again by activating the high side switch 150 again.

Figure 2:
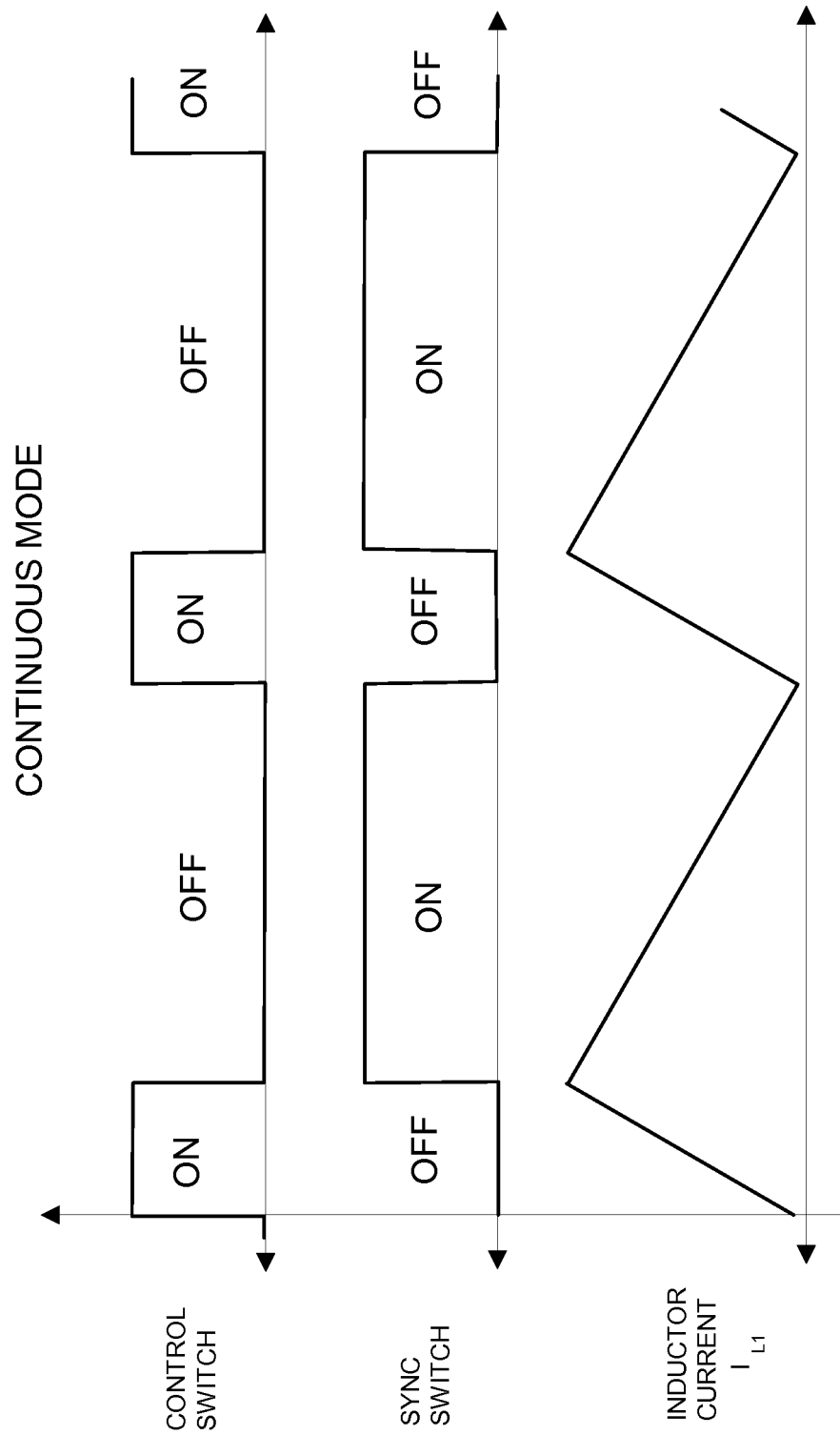
FIG. 2 is an example diagram of a continuous switching mode according to embodiments herein.

FIG. 2 is an example diagram illustrating operation of the power supply 100 in a continuous mode according to embodiments herein.

In accordance with such an embodiment, the controller 140 activates the high side switch 150 (i.e., control switch) to increase the current through the inductor 144 for a first portion of a continuous mode switching cycle. The controller 140 activates the low side switch 160 (i.e., synchronous switch) to decrease the current through the inductor 144 for a second portion of a continuous mode switching cycle.

While in the continuous mode, the controller 140 monitors the average current through the inductor 144. Upon detecting that the average current drops below a threshold value such as 5 amperes, the controller 140 switches over to the discontinuous operational mode as in FIG. 3.

In one embodiment, while in the continuous mode as shown in FIG. 2, the controller 140 monitors the current through the inductor 144 for a negative component. If the current becomes negative during a switching cycle in the continuous mode, the controller 140 switches over to the discontinuous operational mode. Thus, one embodiment herein includes monitoring, while the power supply is in a continuous power supply mode, an amount of current through the inductor. In response to detecting, while in the continuous power supply mode, that a magnitude of the current through the inductor is negative for at least a portion of a switching cycle, the controller initiates switchover from the continuous power supply mode to the discontinuous power supply mode.

One way to detect when to transition to the discontinuous mode is to monitor the total output current of the power supply to power the load 118. The value of the current may be received in digital form from an analog-to-digital converter. The controller 140 can include a digital filter to filter the current measurements.

In further embodiments, based on parameters of the power supply 100 such as the measured filtered current value, a value of the inductor value, and switching frequency, the controller 140 can calculate when the inductor current has a negative component. For example, when the output current supplied by the inductor 144 to the load 118 is less than half the magnitude of the inductor ripple, it can be assumed that at least a portion of the inductor current for a given switching cycle is negative.

The inductor current ripple magnitude=Vout/L*(1−D)*TS, where Vout is the output voltage 190, D is the duty cycle at the control FET (i.e., high side switch 150) and TS is the switching period.

The controller 140 produces the pwm pulses to drive the high side switch 150 and low side switch 160. Thus, the controller 140 knows these pulse width values. The switching period for a switching cycle is known based on these values. The type of driver (e.g., driver 110-1 and driver 110-2) and the corresponding amount of pulse truncation for such devices is also known. Based on this information, the duty cycle D can be calculated as follows:

D=(Avg(pulse widths)−Dr_tt)/TS, where Dr_tt is the driver specific pulse truncation time representing an effective shortening of the pulse received from the controller 140.

Upon calculating or estimating based on the above equations, or physically detecting that a portion of current through the inductor 144 during the switching cycle is negative for at least a portion of a switching cycle or that the average current through the inductor 144 is below a threshold value, the controller 140 initiates operating the power supply in the discontinuous mode. Thus, a digital state machine in the controller 140 can be used to determine when to switch to a diode emulation mode or switch out of it. The conditions for going into and coming out of diode emulation mode may vary depending on a respective application.

Figure 3:
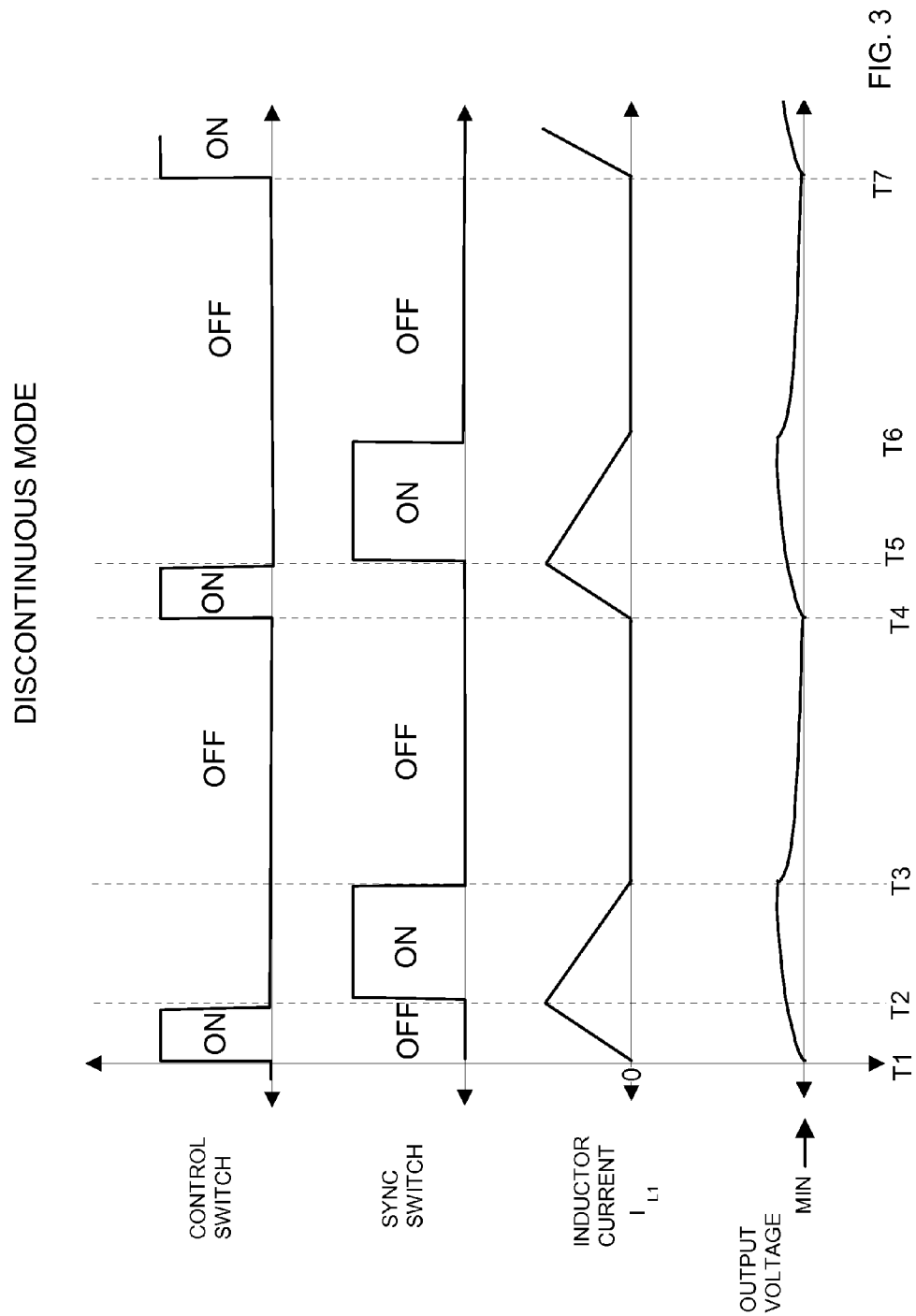
FIG. 3 is an example diagram illustrating of a discontinuous switching mode according to embodiments herein.

FIG. 3 is an example diagram illustrating operation of power supply 100 in a discontinuous mode according to embodiments herein.

As shown, the controller 140 controls the switches ON and OFF to prevent or reduce an amount of negative current from flowing through the inductor 144.

In accordance with one example embodiment, the following calculations apply to a buck converter:

ON_t represents the on time of the control switch (e.g., high side switch 150) and is programmable.

During ON_t (e.g., a time between T1 and T2) in FIG. 3, the current in the inductor rises from 0 to (ON_t−Dr_tt)*(Vin−Vout)/L. As mentioned above, Dr_tt is a correction factor and varies depending on the driver circuit.

During ON_t, L*di/dt=(Vin−Vout).

Via the current estimation and mode control algorithm, the controller 140 calculates the OFF_t to completely discharge all the current in the inductor. OFF_t represents the amount of time the controller activates the low side switch 160.

During OFF_t (e.g., between time T2 and time T3) when the low side switch 160 (e.g., synchronous switch) is activated and the high side switch 150 (e.g., control switch) is deactivated, the current in the inductor 144 falls at the rate Vout/L.

Thus, OFF_t*Vout/L=(ON_t−Dr_tt)*(Vin−Vout)/L; and the on time of the synchronous switch, $$OFF\_t=(ON\_t-Dr\_tt)*(Vin-Vout)/Vout.$$

Some drivers (that could be used to drive the low side switch) may take a long time to switch off the low side switch. Due to this condition, the off time such as when the synchronous switch is activated is longer than intended To alleviate affects of this condition, in one embodiment, the controller 140 includes a programmable correction factor (Off_time_adj) that is subtracted from OFF_t. So, the calculated OFF time for the synchronous switch can be adjusted as follows:

$$OFF\_t\_final=[(ON\_t-Dr\_tt)*(Vin-Vout)/Vout]-Off\_time\_adj$$

Estimating or calculating the time duration in which to activate the switch 160 can include adjusting the time duration in which to activate a driver 110-2 to activate the second switch 160 based at least in part on an amount of time required to deactivate the second switch 160 via the driver 110-2. Accordingly, the controller 140 can initiate activation of the high side switch 150 for a first time duration such as ON_t. The controller 140 calculates a second time duration such as OFF_t based at least in part on the input voltage and output voltage. The control 140 then initiates activation of the low side switch 160 for the second time duration OFF_t. Activation of the low side switch 160 coupling the inductor 144 to a reference voltage (e.g., ground) to reduce an amount of current though the inductor.

Now referring more particularly to FIG. 3, when in the discontinuous mode, the controller 140 activates the high side switch 150 between time T1 and time T2 (e.g., for a time duration of ON_t).

The controller 140 activates the low side switch 160 between time T2 and time T3 (e.g., for a time duration OFF_t).

The controller 140 maintains both the high side switch 150 and the low side switch 160 OFF between times T3 and T4. As shown, the output voltage 190 increases in magnitude between time T1 and T3 and reduces between time T3 and T4. The ripple voltage of the output voltage is a measure from the minimum voltage to the maximum voltage for a switching cycle.

While in a tri-state mode such as between T3 and T4, between T6 and T7, etc. the inductor 144 no longer supplies power to the load 118. During a tri-state mode, the capacitor $C_O$ supplies the power to the load 118.

At time T4, the controller 140 detects that the output voltage 190 drops below a minimum acceptable threshold value. In response to detecting such a condition, the controller 140 initiates turning on the high side switch 150 again between time T4 and time T5. The controller repeats the steps of: turning OFF the high side switch after a predetermined time; activating the low side switch 150 for an estimated time based on parameter such as feedback information 121; and deactivates both the high side switch 150 and the low side switch 160 again until the output voltage 190 falls below a minimum threshold value.

Figure 4:
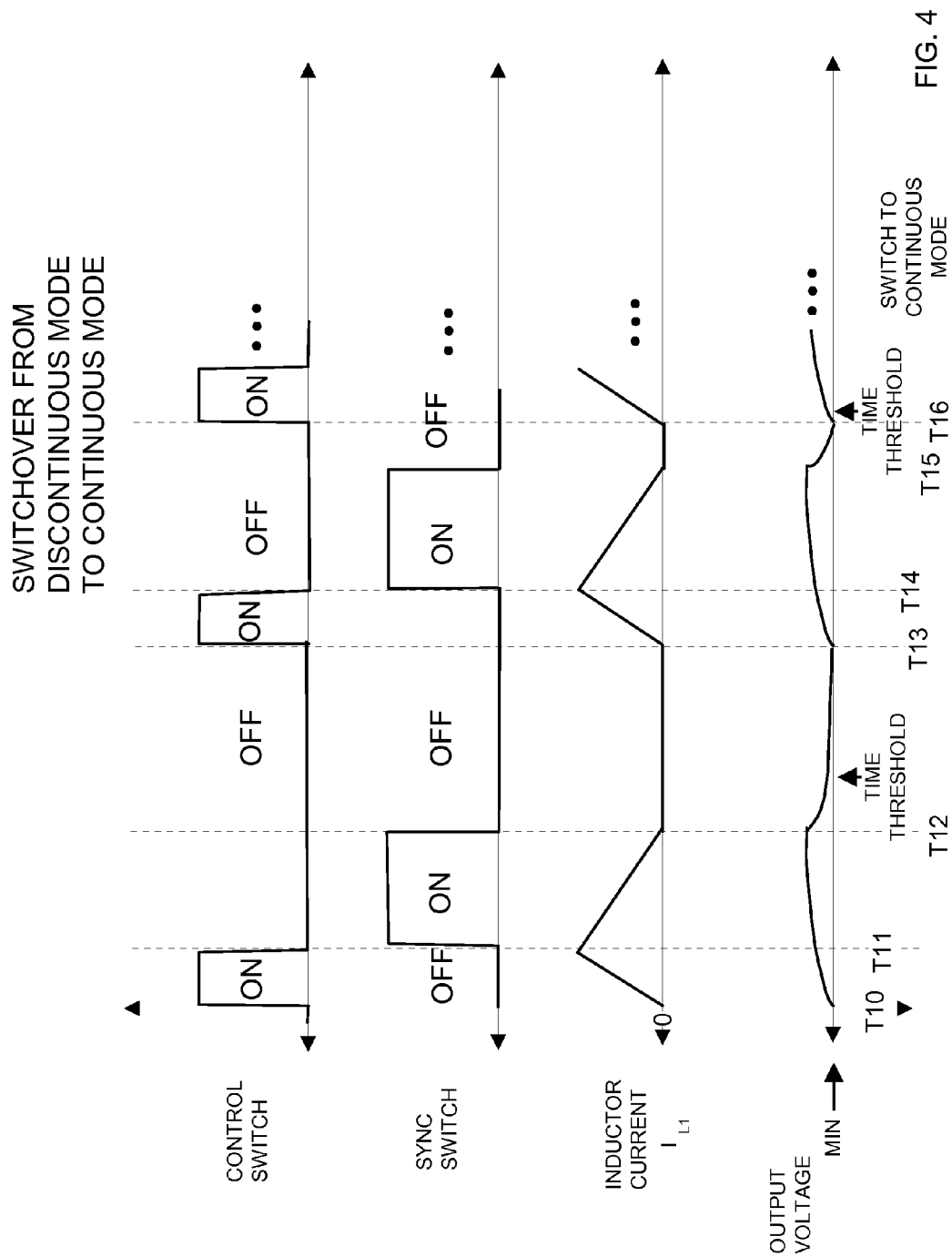
FIG. 4 is an example diagram illustrating of a switchover from a discontinuous switching mode to a continuous switching mode according to embodiments herein.

FIG. 4 is an example timing diagram illustrating a change in switching frequency based on different load conditions and a switchover to a continuous mode according to embodiments herein.

As shown in FIG. 4, the output voltage 190 drops more quickly between time T12 and time T13 than between time T3 and T4 as shown in FIG. 3. FIG. 4 thus illustrates an increased consumption of current compared to consumption illustrated in FIG. 3. For example, when the load 118 consumes more current in FIG. 4, the output voltage 190 drops more quickly resulting in a higher switching frequency to keep the output voltage 190 within regulation.

When the load 118 consumes less current, the output voltage 190 drops less quickly resulting in a lower switching frequency of switches 150 and 160 to keep the output voltage 190 within regulation. As shown, the amount of time in the tri-state mode (e.g., when both the high side switch 150 and the low side switch 160 are off) changes depending on an amount of current consumed by the load 118.

In one embodiment, the controller 140 monitors how long the switches are maintained in the tri-state condition to determine whether to switch to the continuous operational mode as discussed above in FIG. 2. The tri-state condition is a portion of the switching cycle when both the high side switch 150 and the low side switch 160 are off.

If the controller 140 detects that the output voltage 190 drops below the minimum threshold value in less time than a predetermined time threshold value, the controller 140 initiates a switchover to the continuous operational mode to provide an increased amount of current to the load 118.

In one embodiment, the threshold time value for determining whether to switch out of the discontinuous mode to the continuous mode is a programmable value. Assume that the threshold time value is set to 40 nanoseconds. While in the discontinuous mode, in response to detecting that the tri-state time (e.g., time between T15 and T16) is less than 40 nanoseconds due to an increase in current consumption by the load 118, the controller 140 switches from operating in the discontinuous mode to operating in the continuous switching mode as in FIG. 2.

The controller 140 can be a computer, processor, microcontroller, digital signal processor, etc., configured to carry out and/or support any or all of the method operations disclosed herein. In other words, one or more computerized devices or processors can be programmed and/or configured to operate as explained herein to carry out different embodiments of the invention.

Note that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic encoded thereon that, when performed in a computerized device having a processor and corresponding storage, programs the processor to perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the controller 140 to cause the controller 140 to perform the techniques explained herein.

Accordingly, one particular embodiment of the present disclosure is directed to a computer program product that includes a non-transitory computer readable medium (e.g., memory, storage repository, optical disk, integrated circuit, etc.). In other words, the controller 140 as discussed herein can include a computer readable medium for storing the current estimation and mode control algorithm. Such an algorithm supports operations such as power supply switching control functions as discussed herein. For example, in one embodiment, the instructions, when carried out by a controller 140 cause the controller 140 to perform operations as in the flowcharts below.

Figure 5:
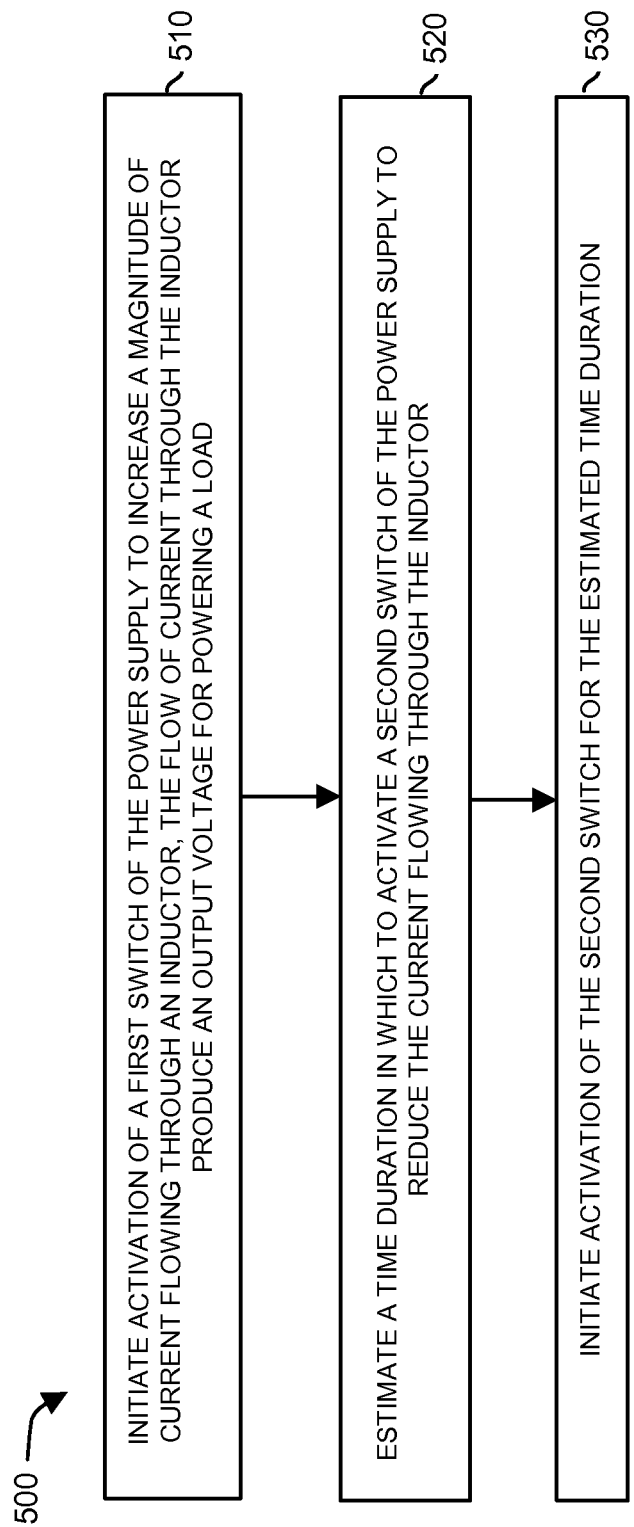
FIGS. 5-8 are flowcharts illustrating example methods according to embodiments herein.

FIG. 5 is a flowchart 500 illustrating an example method of controlling operation of a power supply 100 in a discontinuous mode according to embodiments herein. Note that there will be some overlap with respect to concepts as discussed above. Also, the steps can be executed in any suitable order.

In step 510, the controller 140 initiates activation of a high side switch 150 of the power supply 100 to increase a magnitude of current flowing through the inductor 144.

The flow of current through the inductor 144 produces output voltage 190 for powering load 118.

In step 520, the controller 140 estimates a time duration in which to activate a low side switch 160 of the power supply 100 to reduce the current (e.g., $I_L$) flowing through the inductor 144.

In step 530, the controller 140 initiates activation of the low side switch 160 for the estimated time duration.

Figure 6:
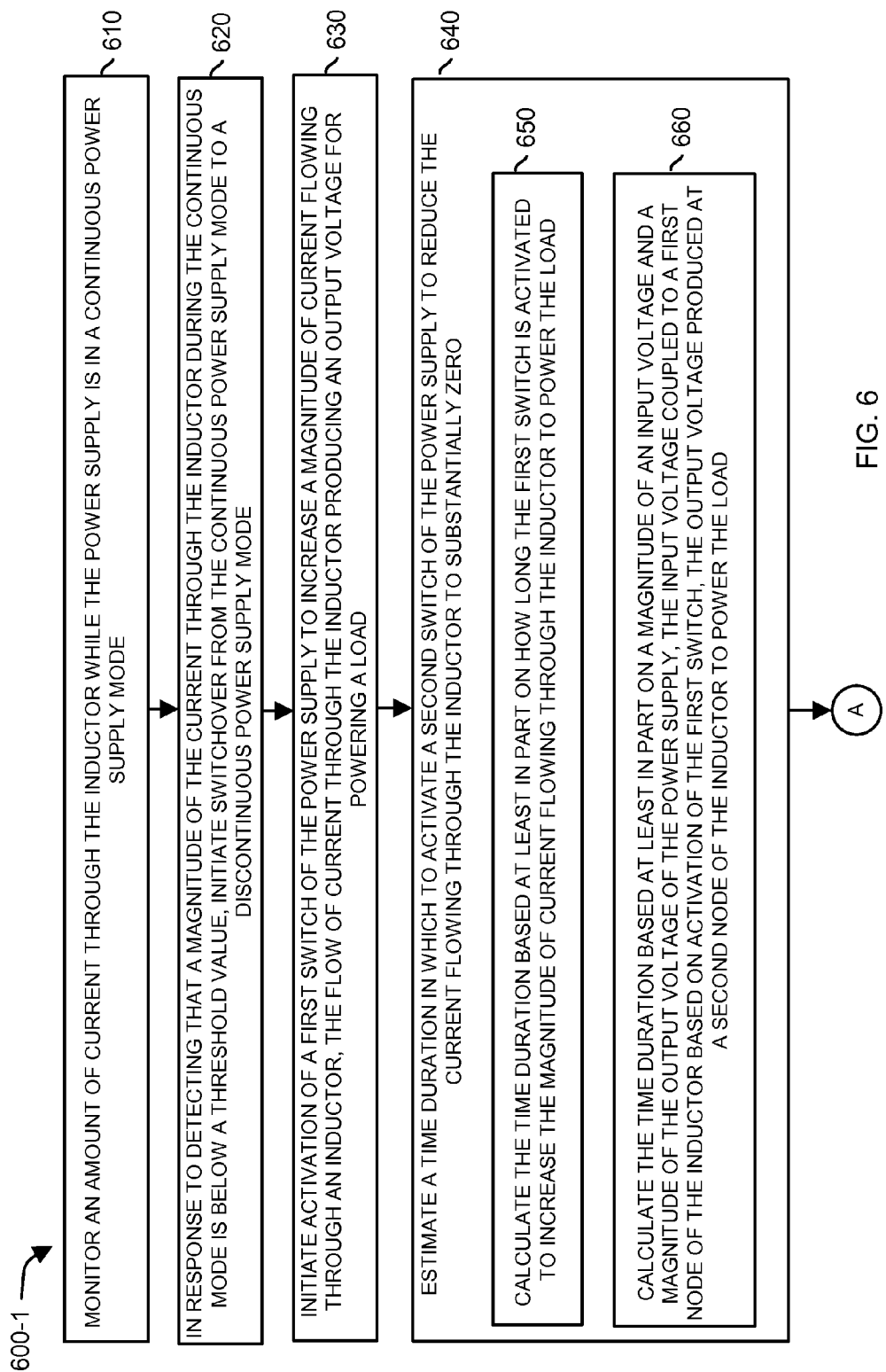
Figure 7:
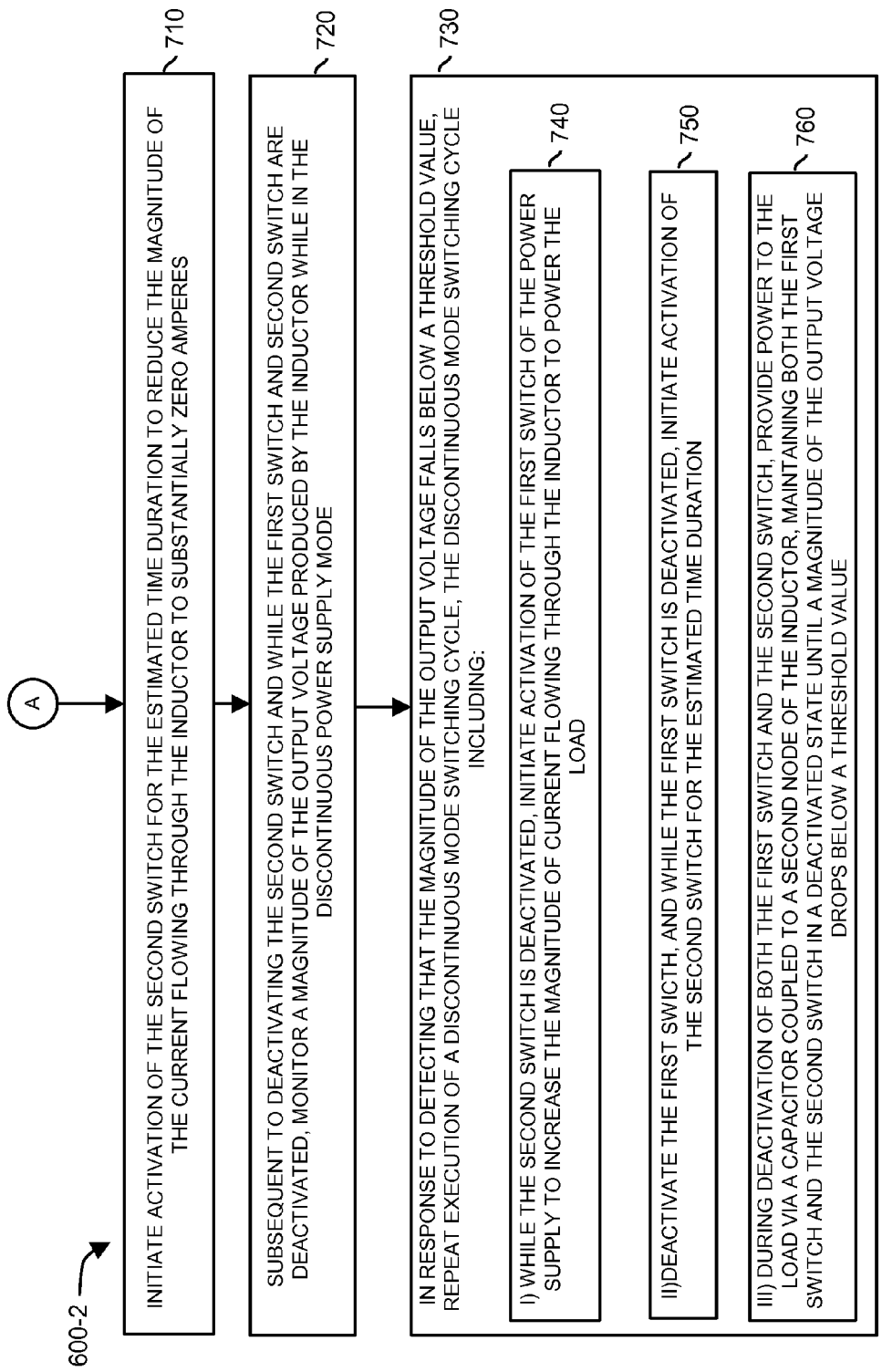

FIGS. 6 and 7 combine to form flowchart 600 (e.g., flowchart 600-1 and flowchart 600-2) illustrating a detailed example method of operating a power supply according to embodiments herein. Note that there will be some overlap with respect to concepts as discussed above. The steps below can be executed in any suitable order.

In step 610 in flowchart 600-1, the controller 140 monitors an amount of current through the inductor 144 while the power supply 100 is in a continuous power supply mode.

In step 620, in response to detecting (based on an estimation or physical measurement) that a magnitude of the current through the inductor 144 during the continuous mode is below a threshold value, the controller 140 initiates switchover from the continuous power supply mode to a discontinuous power supply mode.

In step 630, the controller 140 initiates activation of the high side switch 150 of the power supply 100 to increase a magnitude of current flowing through the inductor 144. The flow of current through the inductor 144 produces an output voltage 190 for powering a load 118.

In step 640, the controller 140 estimates a time duration (e.g., amount of time) in which to activate the low side switch 160 of the power supply 100 to reduce the current flowing through the inductor 144 to substantially zero.

In accordance with an embodiment as in step 650, the controller 140 calculates the time duration based at least in part on how long the high side switch 150 is activated to increase the magnitude of current flowing through the inductor 144 to power the load 118.

In accordance with an embodiment as in step 660, the controller 140 calculates the time duration based at least in part on one or more parameters such as a magnitude of input voltage $V_{IN}$, a magnitude of the output voltage 190, etc.

In step 710 of flowchart 600-2, the controller 140 initiates activation of the low side switch 160 for the estimated time duration to reduce the magnitude of the current flowing through the inductor 144 to substantially zero amperes In step 720, subsequent to deactivating the low side switch 160, the controller 140 monitors a magnitude of the output voltage 190 produced at an output of the inductor 144 while the power supply is in the discontinuous power supply mode.

In step 730, in response to detecting that the magnitude of the output voltage 190 falls below a threshold value, the controller 140 repeats execution of a discontinuous mode switching cycle. Each repeated discontinuous mode switching cycle can include the operations as in steps 740, 750, and 760 as below.

In step 740, while the low side switch 160 is deactivated during a first part of a switching cycle, the controller 140 initiates activation of the high side switch 150 of the power supply 100 to increase the magnitude of current flowing through the inductor 144 to power the load 118.

In step 750, while the high side switch 150 is deactivated during a second part of a switching cycle, the controller 140 initiates activation of the low side switch 160 for the estimated time duration. This reduces an amount of current through the inductor 144.

In step 760, during deactivation of both the high side switch 150 and low side switch 160 during a tri-state portion of a switching cycle, the controller 140 provides power to the load 118 via a capacitor bank $C_O$ coupled to the inductor 144. The controller 140 maintains both the high side switch 150 and the low side switch 160 in a deactivated state (e.g., OFF) until a magnitude of the output voltage 190 drops below a threshold value. After the output voltage 190 drops below the threshold value, the controller 140 repeats steps 740, 750, and 760. See also the timing diagram in FIG. 3.

Figure 8:
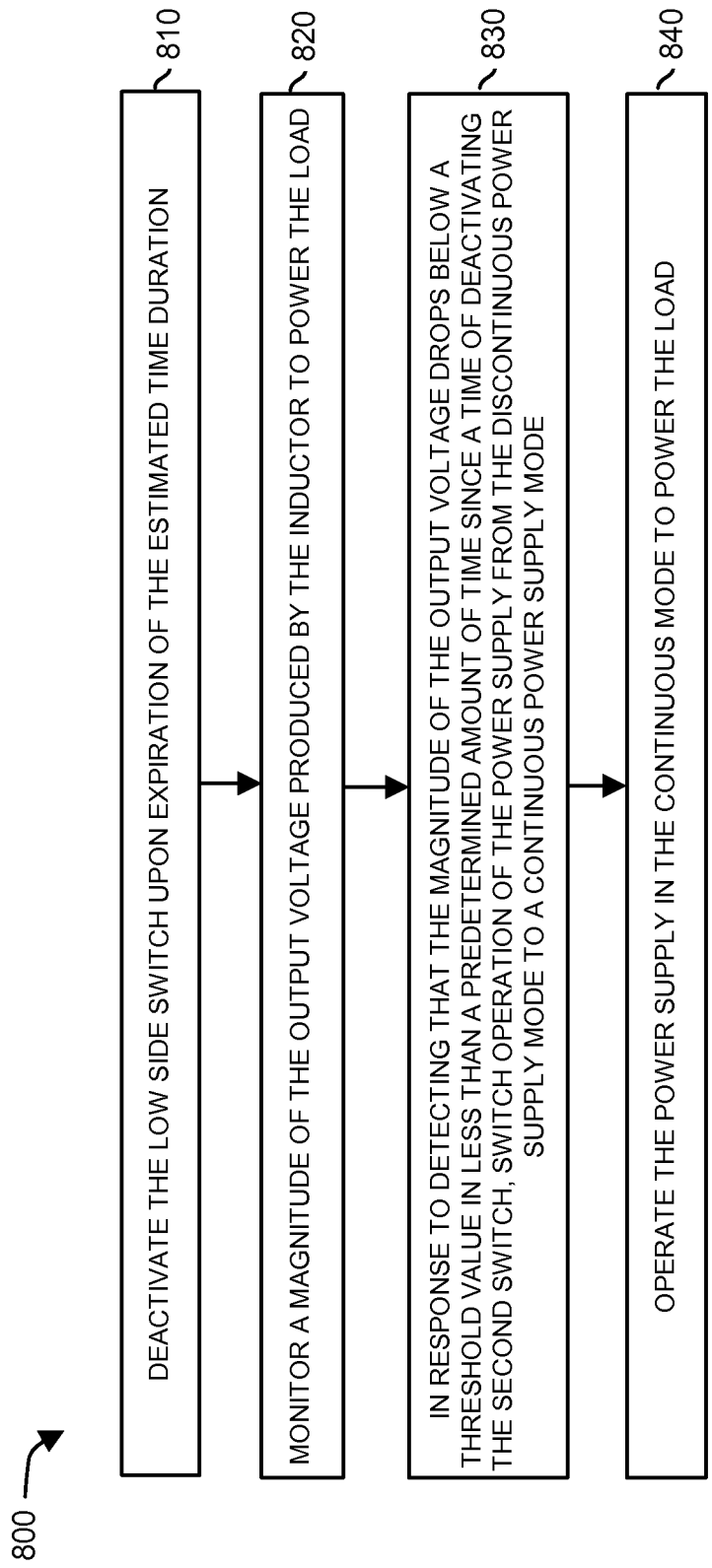

FIG. 8 is a flowchart 800 illustrating an example method of monitoring a magnitude of the output voltage and switchover from a discontinuous mode to a continuous operational mode according to embodiments herein. Note that there will be some overlap with respect to concepts as discussed above. The steps below can be executed in any suitable order.

In step 810, the controller 140 deactivates the low side switch 160 upon expiration of the estimated time duration as previously discussed.

In step 820, the controller 140 monitors a magnitude of the output voltage 190 produced by the inductor 144 to power the load 118.

In step 830, in response to detecting that the magnitude of the output voltage 190 drops below a threshold value in less than a predetermined amount of time since a time of deactivating the low side switch 160, the controller 140 switches operation of the power supply 100 from operating in the discontinuous power supply mode to operating in a continuous power supply mode.

In step 840, the controller 140 operates the power supply in the continuous mode to power the load 118.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   while operating a power supply in a discontinuous power supply mode:
      initiating activation of a first switch of the power supply to increase a magnitude of current flowing through an inductor, the flow of current through the inductor producing an output voltage for powering a load;
      estimating a time duration in which to activate a second switch of the power supply to reduce the current flowing through the inductor, the estimated time duration calculated based at least in part on an estimated amount of current flowing through the inductor at a time of deactivating the first switch; and
      initiating activation of the second switch for the estimated time duration.

2. The method as in claim 1, wherein estimating the time duration includes estimating how long to activate the second switch of the power supply to reduce the magnitude of the current flowing through the inductor to substantially zero; and
   wherein initiating activation of the second switch for the estimated time duration includes activating the second switch for the estimated time duration to reduce the magnitude of the current flowing through the inductor to substantially zero amperes.

3. The method as in claim 1 further comprising:
   monitoring an amount of current through the inductor while the power supply is in a continuous power supply mode; and
   in response to detecting that a magnitude of average current through the inductor during the continuous mode is below a threshold value, initiating switchover from the continuous power supply mode to the discontinuous power supply mode.

4. The method as in claim 1, wherein estimating the time duration includes:
   calculating the time duration based at least in part on a magnitude of an input voltage and a magnitude of the output voltage of the power supply, the input voltage coupled to a first node of the inductor based on activation of the first switch, the output voltage produced at a second node of the inductor to power the load.

5. The method as in claim 1, wherein estimating the time duration includes:
   calculating the time duration based at least in part on how long the first switch is activated to increase the magnitude of current flowing through the inductor to power the load.

6. The method as in claim 1 further comprising:
   while in the discontinuous power supply mode, for each respective switching cycle of multiple switching cycles:
      for a first duration in which the second switch is deactivated, initiating activation of the first switch to increase a magnitude of current through the inductor;
      for a second duration in which the first switch is deactivated, initiating activation of the second switch for the estimated time duration; and
      for a third duration in which both the first switch and the second switch are deactivated, providing power to the load via a capacitor coupled to a second node of the inductor producing the output voltage.

7. The method as in claim 1 further comprising:
   monitoring a magnitude of the output voltage produced by the inductor;
   in response to detecting that the magnitude of the output voltage is below a threshold value, repeating a discontinuous mode switching cycle, the discontinuous mode switching cycle including:
      i) while the second switch is deactivated, initiating activation of the first switch of the power supply to increase the magnitude of current flowing through the inductor to power the load;
      ii) while the first switch is activated, initiating activation of the second switch for the estimated time duration; and
      iii) during deactivation of both the first switch and the second switch, providing power to the load via a capacitor coupled to a second node of the inductor.

8. The method as in claim 1 further comprising:
   while in the discontinuous mode:
      subsequent to activating the second switch for the estimated duration, maintaining both the first switch and the second switch in a deactivated state until a magnitude of the output voltage drops below a threshold value.

9. The method as in claim 1 further comprising:
while in the discontinuous mode, subsequent to initiating activation of the second switch for the estimated time duration:
deactivating the second switch upon expiration of the second time duration;
monitoring a magnitude of the output voltage produced by the inductor to power the load; and
in response to detecting that the magnitude of the output voltage drops below a threshold value in less than a predetermined amount of time since a time of deactivating the second switch, switching operation of the power supply from the discontinuous power supply mode to a continuous power supply mode, detection of the magnitude of the output voltage dropping below the threshold value in less than the predetermined amount time indicating that the load consumes an increase in current.

10. A method comprising:
initiating activation of a first switch for a first time duration, activation of the first switch causing an input voltage to be applied to a first node of an inductor to produce an output voltage at a second node of the inductor to power a load;
calculating a second time duration based at least in part on a magnitude of the input voltage and a magnitude of the output voltage;
generating the second time duration based on a duration of time of activating the first switch multiplied by [(VIN−VOUT)/VOUT], where VIN is the magnitude of the input voltage, where VOUT is the magnitude of the output voltage; and
initiating activation of a second switch for the second time duration, activation of the second switch coupling the first node of the inductor to a reference voltage to reduce an amount of current through the inductor.

11. A power supply system comprising:
a first switch;
a second switch;
an inductor; and
a controller, the controller while in a discontinuous mode configured to:
initiate activation of the first switch of the power supply system to increase a magnitude of current flowing through the inductor, the flow of current through the inductor producing an output voltage for powering a load;
estimate a time duration in which to activate the second switch of the power supply to reduce the current flowing through the inductor; and
initiate activation of the second switch for the estimated time duration;
subsequent to initiating activation of the second switch for the estimated time duration:
deactivate the second switch upon expiration of the time duration;
monitor a magnitude of the output voltage produced by the inductor to power the load; and
in response to detecting that the magnitude of the output voltage drops below a threshold value in less than a predetermined amount of time since a time of deactivating the second switch, initiating switchover operation of the power supply from the discontinuous power supply mode to a continuous power supply mode.

12. The power supply system as in claim 11, wherein the controller estimates how long to activate the second switch to reduce the magnitude of the current flowing through the inductor to substantially zero; and
wherein the controller initiates activation of the second switch for the estimated time duration to reduce the magnitude of the current flowing through the inductor to substantially zero amperes.

13. The power supply system as in claim 11, wherein the controller estimates the time duration based at least in part on an estimated amount of current flowing through the inductor at a time of deactivating the first switch.

14. The power supply system as in claim 11, wherein the controller is configured to:
monitor an amount of current through the inductor while the power supply is in a continuous power supply mode; and
in response to detecting that a magnitude of the current through the inductor during the continuous mode is below a threshold value or that the current through the inductor is negative for at least a portion of a switching cycle, initiate switchover from the continuous power supply mode to the discontinuous power supply mode.

15. The power supply system as in claim 11, wherein the controller is configured to calculate the time duration based at least in part on a magnitude of an input voltage and a magnitude of the output voltage of the power supply, the input voltage coupled to a first node of the inductor based on activation of the first switch, the output voltage produced at a second node of the inductor to power the load.

16. The power supply system as in claim 11, wherein the controller calculates the time duration based at least in part on how long the first switch is activated to increase the magnitude of current flowing through the inductor to power the load.

17. The power supply system as in claim 11, wherein the controller, while operating in the discontinuous power supply mode, for each respective switching cycle of multiple switching cycles:
initiates activation of the first switch to increase a magnitude of current through the inductor for a first duration in which the second switch is deactivated;
initiates activation of the second switch for the estimated time duration for a second duration in which the first switch is deactivated; and
provides power to the load via a capacitor coupled to a second node of the inductor producing the output voltage for a third duration in which both the first switch and the second switch are deactivated.

18. The power supply system as in claim 11, wherein the controller is configured to:
monitor a magnitude of the output voltage produced by the inductor;
in response to detecting that the magnitude of the output voltage falls below a threshold value, repeat a discontinuous mode switching cycle, the discontinuous mode switching cycle including:
i) while the second switch is deactivated, initiate activation of the first switch of the power supply to increase the magnitude of current flowing through the inductor to power the load;
ii) while the first switch is deactivated, initiate activation of the second switch for the estimated time duration; and iii) during deactivation of both the first switch and the second switch, provide power to the load via a capacitor coupled to a second node of the inductor.

19. The power supply system as in claim 11, wherein the controller, while in the discontinuous mode, is configured to:
subsequent to activating the second switch for the estimated duration, maintain both the first switch and the second switch in a deactivated state until a magnitude of the output voltage drops below a threshold value.

20. The power supply system as in claim 18, wherein the switching frequency of the discontinuous mode switching cycle varies depending on a magnitude of the load.

21. The method as in claim 1 further comprising:
monitoring, while the power supply is in a continuous power supply mode, an amount of current through the inductor; and
in response to detecting, while in the continuous power supply mode, that a magnitude of the current through the inductor is negative for at least a portion of a switching cycle, initiating switchover from the continuous power supply mode to the discontinuous power supply mode.

22. The method as in claim 1 further comprising:
receiving, as input, a value representing an ON-time for activating the first switch;
storing the value; and
wherein initiating activation of the first switch includes activating the first switch based on the stored value.

23. The method as in claim 1, wherein estimating the time duration in which to activate the second switch includes:
adjusting the time duration in which to activate a driver to activate the second switch based at least in part on an amount of time required to deactivate the second switch via the driver.

24. The method as in claim 1 further comprising:
receiving, as input, a programmed threshold value;
monitoring a magnitude of the output voltage produced by the inductor;
in response to detecting that the magnitude of the output voltage is below the programmed threshold value while the first switch and the second switch are deactivated, initiating a new discontinuous mode switching cycle, the new discontinuous mode switching cycle including:
i) initiating, while the second switch is deactivated, activation of the first switch of the power supply to increase the magnitude of current flowing through the inductor to power the load;
ii) deactivating the first switch;
iii) while the first switch is deactivated, initiating activation of the second switch for the estimated time duration;
iv) deactivating the second switch; and
iii) during deactivation of both the first switch and the second switch, providing power to the load via a capacitor coupled to a second node of the inductor.

25. The method as in claim 9 further comprising:
operating the power supply in the discontinuous mode in response to detecting that an average current through the inductor falls below a current threshold value during operation in the continuous mode.

26. The method as in claim 25 further comprising:
while in the discontinuous mode: calculating the estimated time duration based at least in part on how long the first switch is activated to increase the magnitude of current flowing through the inductor to power the load.

* * * * *